(12) United States Patent
Scura

(10) Patent No.: US 6,205,635 B1
(45) Date of Patent: Mar. 27, 2001

(54) METHOD FOR ADJUSTING CABLE DETANGLER SYSTEMS

(76) Inventor: Brian Scura, 1514 Valley Ave., Baker City, OR (US) 97814

( * ) Notice: Subject to any disclaimer, the term of this patent is extended or adjusted under 35 U.S.C. 154(b) by 0 days.

(21) Appl. No.: 09/149,865

(22) Filed: Sep. 8, 1998

(51) Int. Cl.[7] .............................. B23Q 17/00; B23P 17/00; B26K 21/12; B26K 21/16
(52) U.S. Cl. ...................... 29/407.1; 29/407.09; 29/423; 74/551.1; 74/501.5 R
(58) Field of Search .............................. 29/407.1, 407.09, 29/423; 74/551.1, 501.5 R; 33/613, 645, 562, 563, 567

(56) References Cited

U.S. PATENT DOCUMENTS

| | | | | |
|---|---|---|---|---|
| 1,881,651 | * | 10/1932 | Judge | 33/562 |
| 3,788,438 | * | 1/1974 | Reno | 74/501.5 R |
| 3,828,625 | * | 8/1974 | Bruhn, Jr. | 74/501.1 R |
| 4,770,435 | * | 9/1988 | Cristie | 74/551.1 |
| 4,958,814 | * | 9/1990 | Johnson | 33/613 |
| 5,058,285 | * | 10/1991 | Morita et al. | 33/563 |
| 5,222,413 | * | 6/1993 | Gallas et al. | 74/501.5 R |
| 5,430,665 | * | 7/1995 | Jin et al. | 364/562 |
| 5,522,276 | * | 6/1996 | Lichtenberg | 74/501.5 R |
| 5,560,260 | * | 10/1996 | Kuo | 74/502.4 |
| 5,605,076 | * | 2/1997 | Wu | 74/551.1 |
| 5,615,585 | * | 4/1997 | Chi | 74/551.1 |
| 5,829,314 | * | 11/1998 | Scura | 74/502.4 |
| 5,913,946 | * | 6/1999 | Ewing | 74/501.5 R |

* cited by examiner

Primary Examiner—I Cuda Rosenbaum
Assistant Examiner—Marc Jimenez
(74) Attorney, Agent, or Firm—Irell & Manella LLP; Andrei Iancu

(57) ABSTRACT

A method for adjusting brake cable detangler systems used on "trick" bicycles in order to eliminate associated bearing flop includes the following steps: position the upper and lower plates of the cable detangler system at an optimum distance from each other for the given system with the aid of a multipurpose gauge, select an upper cable assembly of the proper length for the given handlebar with the aid of the same multipurpose gauge, connect the lower brake cable to the lower unit of the cable detangler system, connect an adjuster cable to the upper unit of the cable detangler system, adjust the adjusting barrels of the lower brake cable until bearing flop in the bearing mechanism of cable detangler system is eliminated, remove the adjuster cable, connect the upper brake cable in place of the adjuster cable, and adjust the adjusting barrels of the upper brake cable until bearing flop in the cable detangler system is eliminated. The multipurpose gauge and the adjuster cable, with the above-described features, are also disclosed.

8 Claims, 6 Drawing Sheets

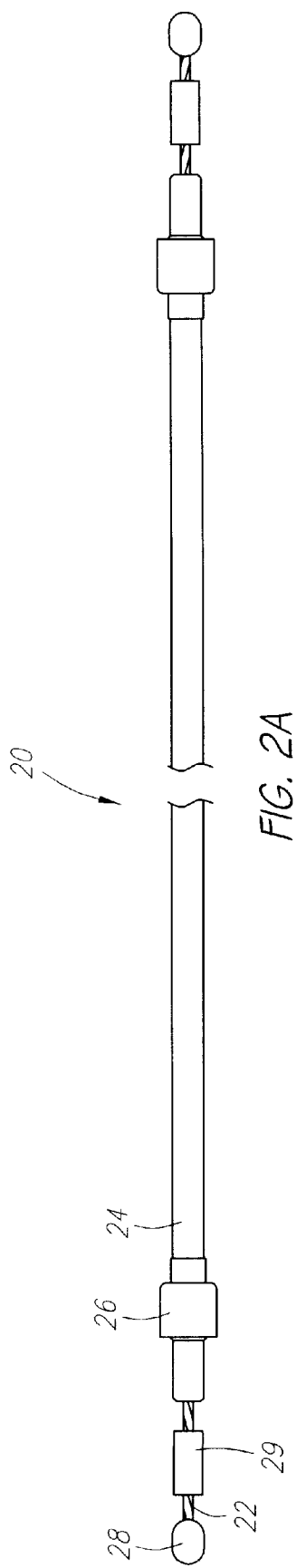
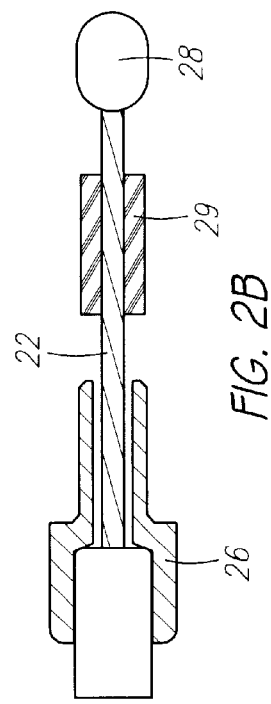
FIG. 2A
FIG. 2B

METHOD FOR ADJUSTING CABLE DETANGLER SYSTEMS

BACKGROUND OF THE INVENTION

1. Field of the Invention

The present invention relates to cabling systems.

2. Relevant Background

Recent attention has been directed to improving bicycles and devices and systems used on bicycles for purposes of "trick" riding. Trick riding involves performing stunts, unusual, difficult, and sometimes dangerous maneuvers on bicycles. Many of the stunts performed by trick riders involve rotating the handlebar and front wheel steering assembly through multiple consecutive turns. Some of these stunts require precise control of the rear brake. Many trick bicycles, however, employ a hand brake system for the rear wheel. The hand brake is located on the handlebars and is cabled to a rear wheel brake system. Accordingly, trick bicycles use a rear brake cable detangler system to allow the handlebar and front wheel steering assembly to be rotated indefinitely without tangling the rear brake cable around the steering assembly.

Rear brake cable detanglers are well know within the bicycle art. Cable detangler systems generally comprise an upper cable assembly, a lower cable assembly, and a bearing mechanism. In turn, the bearing mechanism generally consists of an upper cable stop plate, a lower cable stop plate, and a bearing unit having an upper section and a lower section. The upper cable assembly generally has an end that attaches to a handlebar mounted brake lever, then splits into 2 cables that individually pass through diametrically opposing holes in the upper cable stop plate, and ultimately attach to the upper section of the bearing unit. The lower cable assembly generally has an end that attaches to a rear wheel brake system, then splits into 2 cables that individually pass through diametrically opposing holes in the lower cable stop plate, and ultimately attach to the lower section of the bearing unit. As the bicycle rider pulls the handlebar mounted brake lever, the upper cable assembly pulls the upper section and lower section of the bearing unit toward the upper cable stop plate, which, in turn, pulls the lower cable assembly causing the rear wheel brake system to be activated.

However, it is important for trick riding stunts that the rear brake cable detangler system is properly adjusted. An improperly adjusted cable detangler adversely effects the rider's control of the rear brake, and ultimately the stunt. Prior to the present invention, cable detanglers of this type either went unadjusted, or were adjusted by trial and error. Furthermore, in cases where the cable detangler was improperly installed, proper adjustment of the cable detangler was not possible altogether. The majority of rear brake cable detangler systems on trick bicycles today are improperly adjusted, and a number of those are improperly installed. Therefore, a need was perceived for a cable detangler adjustment procedure that is easy to implement and assures proper adjustment.

SUMMARY OF THE INVENTION

The present invention is directed to a method for adjusting cable detangler systems. The adjustment is performed in the following three generalized steps:

1. Position the upper and lower cable stop plates of the cable detangler system at an optimum distance from each other. This is accomplished by measuring the distance between the upper cable stop plate and the lower cable stop plate with a gauge, and then, as necessary, by inserting or removing spacers underneath the upper cable stop plate to achieve the optimum distance.

2. Measure the most direct distance between the upper cable stop plate and the handlebar mounted rear brake lever with a measuring device that clearly indicates the correct size upper cable assembly to use on that bicycle, then, as necessary, install or replace the upper cable assembly with one of correct size.

3. Position the bearing unit of the cable detangler system perpendicular to the steering axis of the bicycle. This is accomplished by the use of an adjuster cable device comprising a brake cable inserted in a cable casing. One ferrule placed at each end of the cable casing connects the adjuster cable to the upper cable stop plate of the cable detangler system. Protruding ends larger than the brake cable itself connected to each end of the adjuster cable attach the cable to the bearing. Pairs of adjusting barrels and protruding ends attached to the lower brake cable assembly are connected to the lower cable stop plate and the bearing, respectively, of the cable detangler system. The two adjusting barrels on the lower cable assembly positioned on opposite sides of the detangler system are adjusted until the bearing mechanism is perpendicular to the steering axis of the bicycle. The adjuster cable applies a constant counter-force during the adjustment. Adjustment of the bearing mechanism is complete when, while rotating the handlebar and front wheel steering assembly through multiple consecutive turns, gaps do not develop between reference collars attached to the ends of the adjuster cable and the corresponding ferrule on the same end of the adjuster cable. Thereafter, the adjuster cable is removed and in its place the upper cable assembly is connected to the detangler system. The upper brake cable is subsequently adjusted in a similar fashion until the bearing unit does not flop when the handlebar and front wheel steering assembly are rotated through multiple consecutive turns.

Accordingly, it is an object of the present invention to describe a method for adjusting cable detangler systems.

It is another object of the present invention to describe a method for adjusting cable detangler systems that ensures optimum spacing between the upper cable stop plate and the lower cable stop plate of the cable detangler system.

It is another object of the present invention to describe a method for adjusting cable detangler systems that ensures safe and adequate brake cable travel distances and ensures use of a proper size upper cable assembly.

It is another object of the present invention to describe a method for adjusting cable detangler systems that eliminates the bearing unit flop caused by rotating the handlebar and front wheel steering assembly when the cable detangler is improperly adjusted.

Other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings schematically illustrate preferred embodiments of the present invention in which:

FIG. 2A is a plan view of a preferred embodiment of an adjuster cable;

FIG. 2B is a cross-sectional view through an end of the adjuster cable of FIG. 2A;

DETAILED DESCRIPTION OF THE PREFERRED EMBODIMENT

Figure 1:
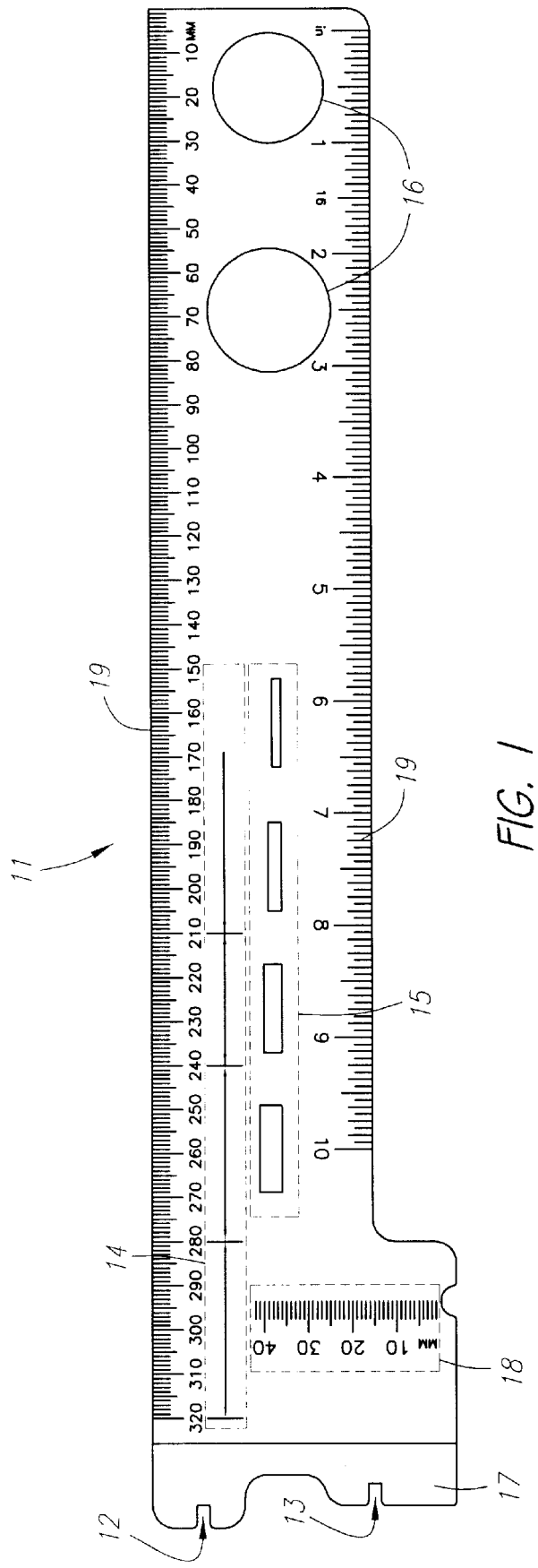
FIG. 1 is a plan view of a preferred embodiment of a multipurpose gauge.

Turning in detail to the drawings, FIG. 1 illustrates the multipurpose gauge of the present invention. Multipurpose gauge 11 comprises notches 12 and 13 which are spaced to the optimum distance between the upper cable stop plate 32 and the lower cable stop plate 40 of cable detangler system 30 (see FIG. 3). The optimum distance depends on the cable detangler system used. Bicycle cable detangler systems are well known in the art and are used by bicycle "trick" riders. Such cable detangler systems allow the handlebars of a bicycle to spin without causing tangling of brake cables. Cable detangler systems such as the one (30) depicted in FIGS. 3 and 4 of the present invention, employ a bearing mechanism 34 mounted on a steering assembly or other location on a bicycle 10. Cable detangler system 30 also has an upper cable stop plate 32, to which upper cable assembly 50 is attached, and a lower cable stop plate 40, to which lower cable assembly 36 is attached. Such cable detangler systems will not be described further herein, except as relevant to aid understanding of the preferred embodiments of the present invention.

Figure 4:
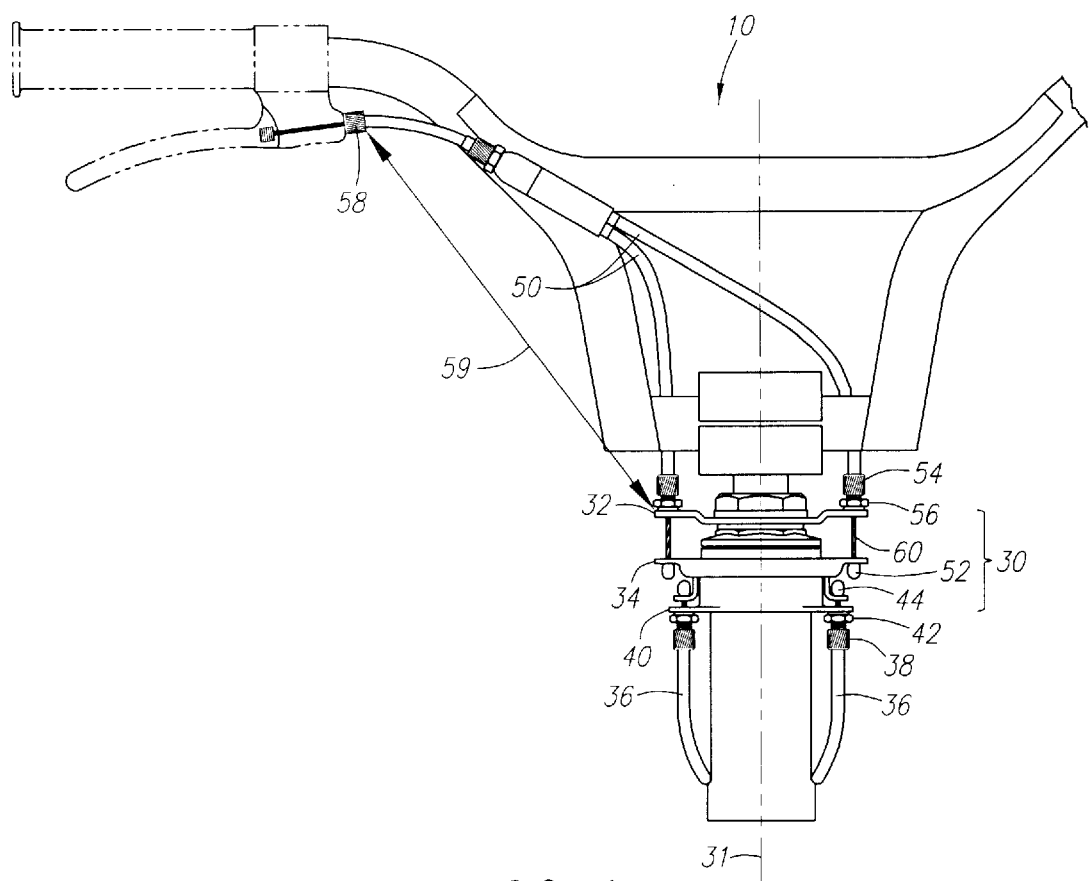
FIG. 4 is a front view of a bicycle with an adjusted cable detangler system.
Figure 5:
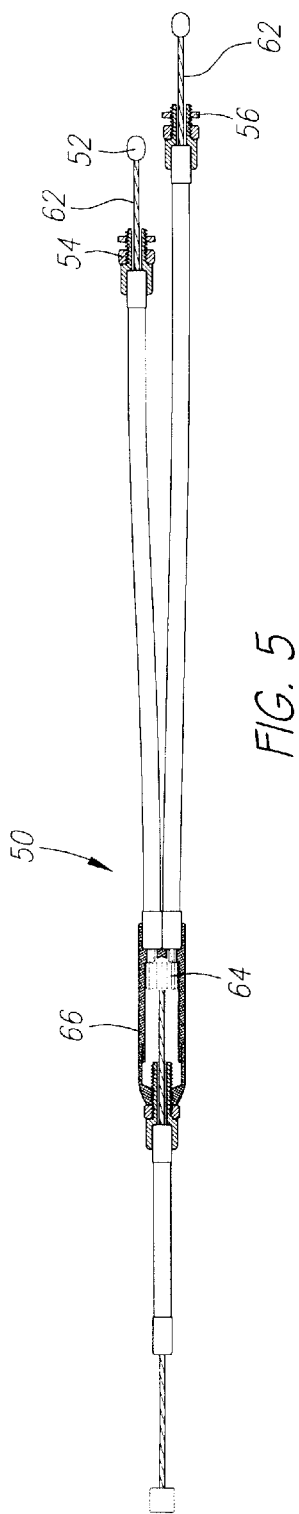
FIG. 5 is a plan view of an upper cable assembly.
Figure 6:
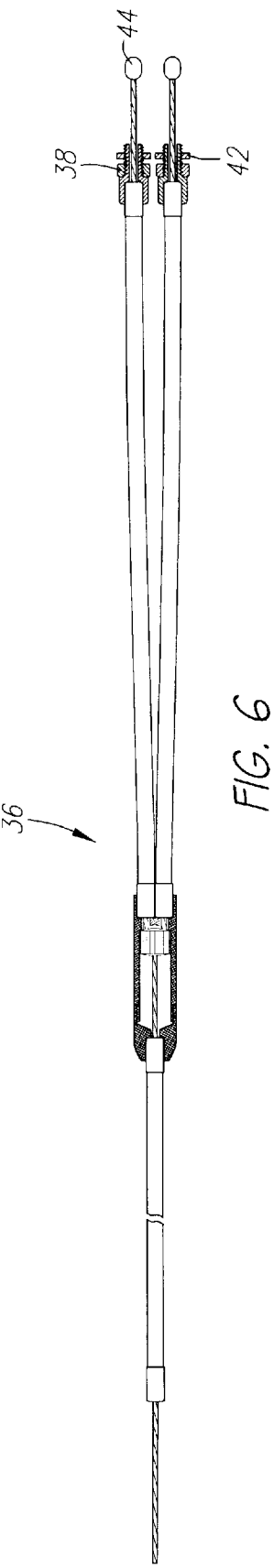
FIG. 6 is a plan view of a lower cable assembly.

Multipurpose gauge 11 further comprises marks 14 to aid in the selection of the proper length of upper cable assembly 50 (See FIG. 4). Furthermore, notches 15 and diameter rings 16 are provided to aid in the selection of spacers used to position the upper cable stop plate 32 and the lower cable stop plate 40 to the optimum spacing. Multipurpose gauge 11 has further features, such as tab 17 to measure the minimum space necessary for the safe travel of bearing 34, marks 18 that aid in the measurement of the exposed free cable length 62 of the upper cable assembly 50 (see FIG. 5), and marks 19 which provide common rulers to aid in various other measurements associated with the installation of cable detangler systems and brake systems. The various entities of the multipurpose gauge 11 can be combined in one unit, such as the multipurpose gauge 11 of the present invention, or each can stand alone as a separate device.

For the first step, therefore, in the method of the present invention, the upper cable stop plate 32 and the lower cable stop plate 40 of the cable detangler system 30 are positioned at the optimum distance from each other for the particular detangler mechanism selected. To aid in the measurement of that distance, notches 12 and 13 of multipurpose gauge 11 are used by assuring that the upper cable stop plate 32 fits in notch 12 and the lower cable stop plate 40 fits in notch 13, or vice versa, at the same time. Notches 12 and 13 are sized to accommodate the thicknesses of upper cable stop plate 32 and lower cable stop plate 40. Notches 12 and 13 are spaced such that the minimum distance between the notches 12 and 13 corresponds to the minimum optimal interior distance between the upper cable stop plate 32 and the lower cable stop plate 40, and the maximum distance between the notches 12 and 13 corresponds to the maximum optimal exterior distance between the upper cable stop plate 32 and the lower cable stop plate 40. If changes have to be made to achieve the optimum spacing, spacers can be inserted underneath the upper cable stop plate 32. The spacers can be selected by using notches 15 and diameter rings 16 in multipurpose gauge 11.

For step two of the method of the present invention, marks 14 are used to select the proper length for the upper cable assembly 50, corresponding to distance 59 between the adjusting barrel 58 of the bicycle brake lever and the upper cable stop plate 32, as shown in FIG. 4. If the length of the upper cable assembly 50 is too long, it will cause an excessive "S" curve in the upper cable assembly 50 and create an excessive loop in the upper cable assembly 50 above the bicycle handlebar crossbar. The excessive "S" curve decreases the efficiency and performance of the rear wheel brake system and can cause the flop adjustment of the detangler mechanism 30 to sporadically change when the rider inadvertently moves the upper cable assembly 50 during execution of a trick. The excessive loop in the upper cable assembly 50 above the bicycle handlebar crossbar can pose a hazard to the rider if the rider hooks his or her foot, or other part of his or her anatomy, in the excessive loop during execution of a trick. Conversely, if the upper cable assembly 50 is too short, it will cause a bind in the upper cable assembly 50 and/or cause one or more of the various cable casings of the upper cable assembly 50 to become unseated. A bind in the upper cable assembly 50 could cause a decrease in the efficiency and performance of the rear wheel brake system and unseating of one or more of the various cable casings of the upper cable assembly 50 will cause the detangler mechanism 30 to flop every time the break is activated and the handlebar spun because activating the rear wheel brake system will cause the various cable casings of the upper cable assembly 50 to become more seated, thus changing the flop adjustment of the detangler mechanism 30.

For step three of the method of the present invention, the bearing mechanism 34 is adjusted to be perpendicular to the steering axis 31 of bicycle 10 with the aid of adjuster cable 20. See FIGS. 3 and 4. Adjuster cable 20 allows the adjustment of the lower cable assembly 36 independent of the upper cable assembly 50. This is important because the lower cable assembly 36 can be adjusted and locked in position by its two locknuts 42. Later in the adjustment procedure, the upper cable assembly 50 can be adjusted and locked in position by its own locknuts 52 in correlation to the already adjusted lower cable assembly 36. Thus, the adjuster cable 20 provides a constant counter-force by which the two variable lower and upper cable assemblies, 36 and 50, respectively, can by adjusted, adjusting in this fashion the bearing mechanism 34. It should be noted that step three can be reversed where the adjuster cable 20 allows the adjustment of the upper cable assembly 50 independent of the lower cable assembly 36. This is also important because the upper cable assembly 50 can be adjusted and locked in position by its two locknuts 52. Later in the adjustment procedure, the lower cable assembly 36 can be adjusted and locked in position by its own locknuts 42 in correlation to the already adjusted upper cable assembly 50. Thus, the adjuster cable 20 provides a constant counter-force by which the two variable upper and lower cable assemblies, 50 and 36, respectively, can by adjusted, adjusting in this fashion the bearing mechanism 34.

FIG. 2A illustrates the preferred embodiment of the detangler system adjuster cable 20. Adjuster cable 20 comprises a bicycle brake cable 22 partially covered by cable casing 24, with a pair of ferrules 26 at each end of the cable casing 24. Cable 22 can slide freely inside casing 24. Ferrules 26 can be threaded or unthreaded, and attached to casing 24 or free to slide independently on cable 22. The bicycle brake cable 22 has two ends, to each of which is connected a protruding end 28. The protruding ends 28 could take different shapes, such as spherical or ellipsoidal as long as they have a diameter larger than the diameter of the bicycle brake cable 22. Adjuster cable 20 finally has, as an option, two reference collars 29 placed at either end of brake cable 22. Reference collars 29 can be made of any material, but they have to elastically hold on to brake cable 22 and yet be able to slide along brake cable 22 when force is applied. See FIG. 2B.

Figure 3A:
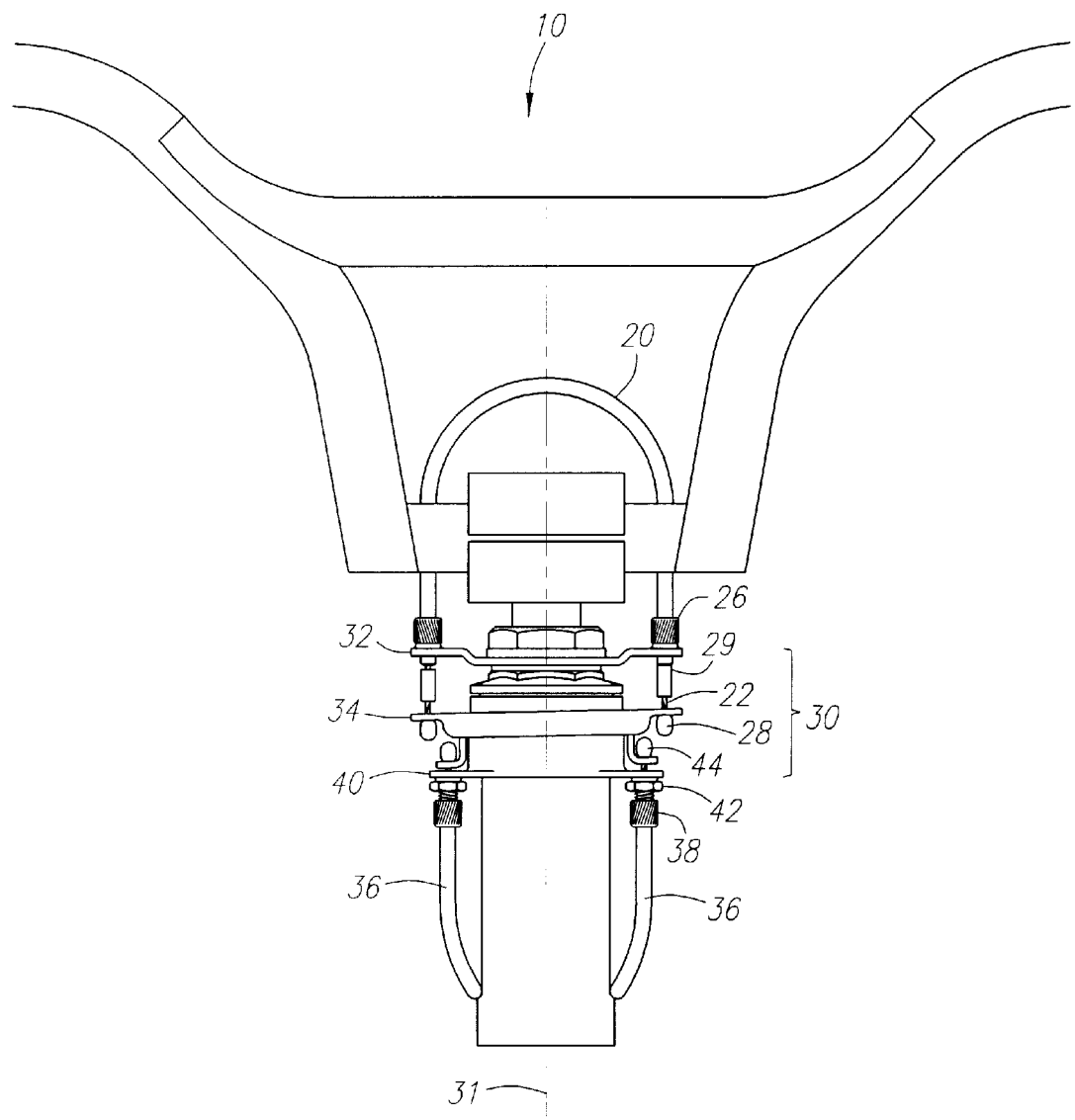
FIG. 3A is a front view of a bicycle with an unadjusted cable detangler system and an adjuster cable installed in place of the upper cable assembly.

To adjust the bearing mechanism 34, as shown in FIG. 3A, lower cable assembly 36 is first installed by connecting adjusting barrels 38 to the lower cable stop plate 40 such that one of them, preferably the one on the non-chainwheel side of the bicycle 10, is flush with the top of its corresponding threaded hole in the lower cable stop plate 40. The corresponding locknut 42 is tightened, and the other adjusting barrel 38 is screwed into its corresponding threaded hole in the lower cable stop plate 40 approximately one thread with its corresponding locknut 42 loose. Since one adjusting barrel 38 is flush and its corresponding locknut 42 tightened while the other adjusting barrel 38 is screwed in one thread with its corresponding locknut 42 loose, the correct adjustment for lower cable assembly 36 must reside in screwing the loose adjusting barrel 38 further into lower cable stop plate 40. The protruding ends 44 attached to the lower cable assembly 36 are then connected to the bearing 34. The rear brake is then secured and locked in place, and a third hand tool is installed on the rear brake caliper.

Next, adjuster cable 20 is attached to the upper cable stop plate 32 of cable detangler system 30, in the place of upper cable assembly 50. One of the ferrules 26 of the adjuster cable 20 is connected to the upper cable stop plate 32. The protruding end 28 on the same side of the bicycle brake cable 22 as the ferrule 26 just connected is attached to the bearing 34. The same steps are followed for the other ferrule 26 and protruding end 28. The third hand tool on the rear brake caliper is then removed so the return spring on the rear brake can apply a spring force against the adjuster cable 20.

Figure 3B:
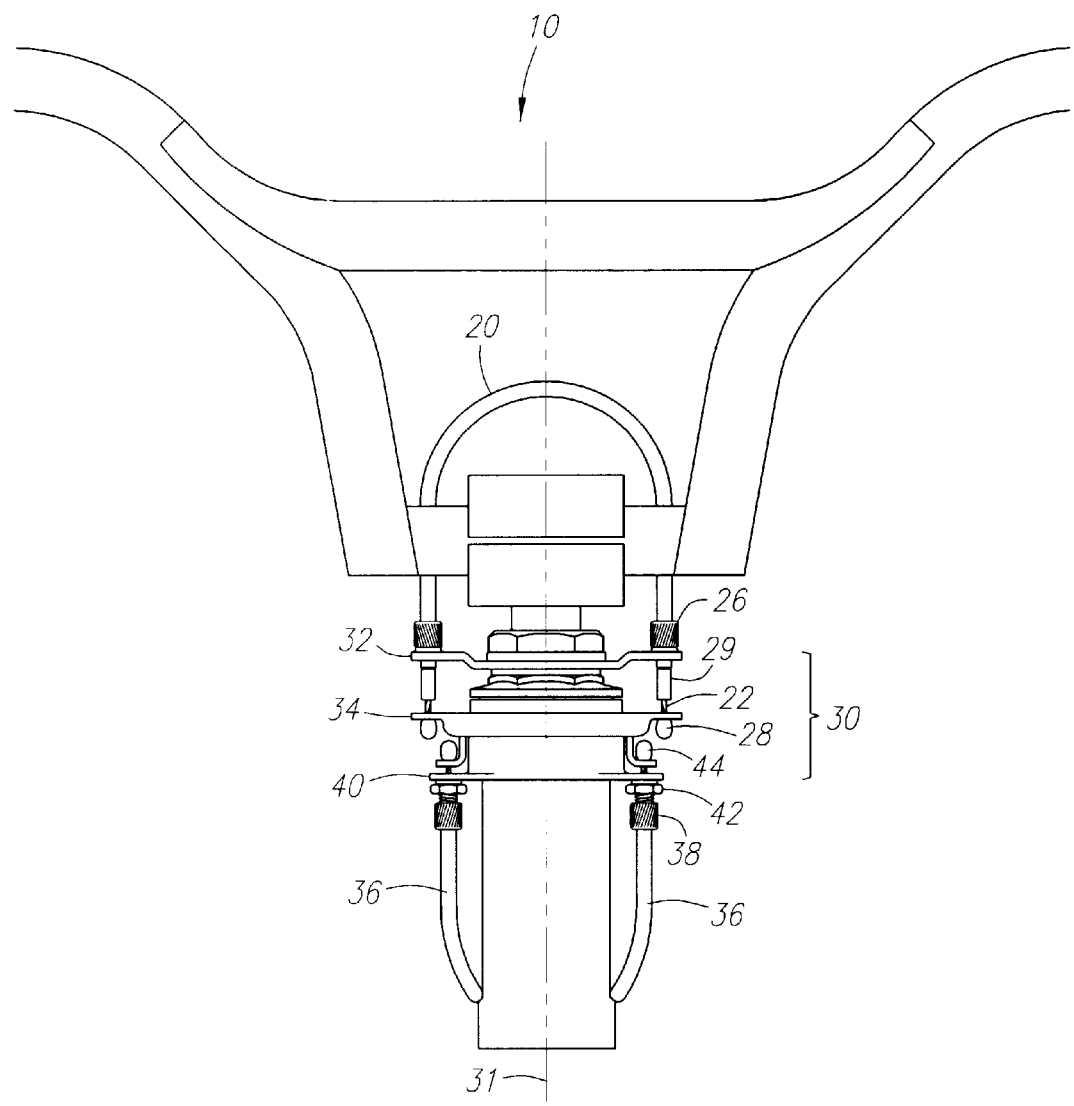
FIG. 3B is a front view of a bicycle with an adjusted cable detangler system and an adjuster cable installed in place of the upper cable assembly.

As FIG. 3A illustrates, for adjustment of the lower cable assembly 36 the four protruding ends, 28 and 44, must be properly seated in the recesses provided in the bearing 34. While rotating the fork of bicycle 10 with one hand, the loose adjusting barrel 38 of the lower cable assembly 36 is adjusted with the other hand. The lower cable assembly 36 is fully adjusted when all the bearing flop is eliminated. Bearing flop can be checked visually. Alternatively, reference collars are positioned against the ferrules 26 of the adjuster cable 20, and then the fork of bicycle 10 is rotated through multiple consecutive turns. If the bearing still flops, a gap will be observed between the ferrules 26 and the reference collars 29. FIG. 3A shows the reference collars with an unadjusted detangler system 30 and FIG. 3B shows the reference collars with an adjusted detangler system 30, both after multiple consecutive turns of the fork of bicycle 10.

To complete adjustment, locknut 42 on the same side of the lower cable assembly 36 as the loose adjusting barrel 38 is tightened. The adjustment of lower cable assembly 36 can be rechecked by rotating the fork of bicycle 10. If the flop in bearing 34 returns after tightening the locknut 42, the following steps must be followed to eliminate the flop: (1) loosen the one locknut 42 that was last tightened, (2) compensate for whatever caused the lower cable assembly 36 to come out of adjustment when that locknut 42 was tightened, (3) re-tighten the same locknut 42, and (4) recheck the adjustment of lower cable assembly 36. After the adjustment of lower cable assembly 36 is complete, the adjuster cable 20 is removed. Note that the protruding ends 28 of the adjuster cable 20 are easier to detach if the fork of bicycle 10 is rotated 90 degrees with the end to be detached toward the front of the bicycle 10.

Thereafter, the upper cable assembly 50 is installed, as shown in FIG. 4, by connecting adjusting barrels 54 to the upper cable stop plate 32 such that one is flush with the top of its corresponding threaded hole in the plate 32 and its corresponding locknut 56 is tightened. Then, the other adjusting barrel 54 is screwed into its corresponding threaded hole in upper cable stop plate 32 approximately one thread with its locknut 56 loose. Since one adjusting barrel 54 is flush and its corresponding locknut 56 tightened while the other adjusting barrel 54 is screwed in one thread with its corresponding locknut 56 loose, the correct adjustment for the upper cable assembly must reside in screwing the loose adjusting barrel 54 futher into the upper cable stop plate 32. The barrel end 58 of upper cable assembly 50 is attached to the brake lever, ensuring first that the upper cable assembly 50 is not twisted. The protruding ends 52 attached to the upper cable assembly 50 are then connected to the bearing 34.

As depicted in FIG. 4, to adjust the upper cable assembly 50, the protruding ends 52 on the upper cable assembly 50 and the protruding ends 44 on the lower cable assembly 36 must be properly seated in the recesses provided in the bearing 34. With one hand, continuously turn the fork of bicycle 10 back and forth, about a quarter turn. During the turns, the protruding ends 52 of the upper cable assembly 50 and the protruding ends 44 of the lower cable assembly 36 must repeatedly cross. With the other hand, adjust the loose adjusting barrel 54 of the upper cable assembly 50 until all the flop in bearing 34 is eliminated. Bearing flop can be checked visually. Alternatively, removable reference collars can be placed on the cable portion 60 of upper cable assembly 50, and the same procedure can be used for checking flop as that described above with respect to adjuster cable 20.

Next, the fork of bicycle 10 is rotated 180 degrees. The previous steps are repeated to fine tune the adjustment of upper cable assembly 50. To ensure that the flop in bearing 34 is eliminated, rotate the fork of bicycle 10 several consecutive 360 degree turns. If the bearing 18 flops every time the protruding ends 52 of the upper cable assembly 50 and the protruding ends 44 of the lower cable assembly 36 cross, then the upper cable assembly 50 adjustment procedure must be repeated. If, however, the bearing flops every other time the protruding ends 52 of the upper cable assembly 50 and the protruding ends 44 of the lower cable assembly 36 cross, then the lower cable assembly 36 and the upper cable assembly 50 adjustment procedures must be repeated, in that particular order.

To complete adjustment of the upper cable assembly 50, the locknut 56 on the same side of the upper cable assembly 50 as the loose adjusting barrel 54 must be tightened. To recheck the adjustment of the upper cable assembly 50, rotate the fork of bicycle 10. If the bearing flop returns after tightening the locknut 56, the following steps must be conducted: (1) loosen the one locknut 56 that was last tightened, (2) compensate for whatever caused the upper cable assembly 50 to come out of adjustment when that locknut 56 was tightened, (3) re-tighten the same locknut 56, and (4) recheck the adjustment of upper cable assembly 50.

From this disclosure of the present invention, it will be obvious to one skilled in the art that one could reverse this adjusting procedure by first adjusting the upper cable assembly 50 and installing the adjuster cable 20 in place of the lower cable, and adding a pretension or spring tension device to the upper cable assembly 50 or to the adjuster cable 20. If the adjusting step to make the bearing mechanism 34 perpendicular to the steering axis 31 of bicycle 10 is reversed, the corresponding steps will also be reversed.

Thus, a method for adjusting cable detangler systems which includes a detangler system adjuster cable and a multipurpose gauge, have been disclosed. While variations of the illustrated preferred embodiments have been shown and described, it would be apparent to those skilled in the art that many more modifications are possible without departing from the inventive concepts herein. For example, while the order of the steps described above is the preferred embodiment, various different orders can be employed without materially affecting the invention. The invention, therefore, is not to be restricted except in the spirit of the appended claims.

I claim:

1. A method for adjusting a brake cable detangler system having a bearing with an adjuster cable having ends and ferrules, the brake cables including ends and adjusting barrels, comprising the steps of:

connecting the ends and adjusting barrels of a first brake cable to the cable detangler system;

connecting the ends and ferrules of the adjuster cable to the cable detangler system;

adjusting the adjusting barrels of the first brake cable until the bearing of the cable detangler system ceases to flop; and removing the adjuster cable.

2. The method of claim 1, further comprising the steps of:

connecting the ends and adjusting barrels of a second brake cable to the cable detangler system; and adjusting the adjusting barrels of the second brake cable until the bearing of the cable detangler system ceases to flop.

3. The method of claim 1, wherein the cable detangler system comprises upper and lower plates, the method further comprising the step of placing the upper and lower plates at an optimum distance from each other.

4. The method of claim 1, wherein reference collars are slidably connected to the first brake cable and the adjuster cable, the method further comprising the step of:

observing whether the reference collars slidably connected to either the first brake cable or the adjuster cable are displaced.

5. The method of claim 2, wherein reference collars are slidably connected to the first brake cable and the adjuster cable, the method further comprising the step of:

observing whether the reference collars slidably connected to either the first brake cable or the second brake cable are displaced.

6. A method for adjusting a brake cable detangler system having at least an upper plate, a lower plate, and a bearing, the brake cables including ends and adjusting barrels, the method comprising the steps of:

selecting an adjuster cable having ends and ferrules;

placing the upper and lower plates of the cable detangler system at an optimum distance from each other;

connecting the ends and adjusting barrels of a first brake cable to the cable detangler system;

connecting the ends and ferrules of the adjuster cable to the cable detangler system;

adjusting the adjusting barrels of the first brake cable until the bearing of the cable detangler system ceases to flop;

removing the adjuster cable;

connecting the ends and adjusting barrels of a second brake cable to the cable detangler system; and adjusting the adjusting barrels of the second brake cable until the bearing of the cable detangler system ceases to flop.

7. The method of claim 6, wherein reference collars are slidably connected to the first brake cable and the adjuster cable, the method further comprising the step of:

observing whether the reference collars slidably connected to either the first brake cable, the second brake cable, or the adjuster cable are displaced.

8. The method of claim 7, further comprising the steps of:

selecting a gauge; and using the gauge to select an upper cable assembly of the optimum length to connect to the cable detangler system.

* * * * *